(12) United States Patent
Lessmann (10) Patent No.: US 9,451,055 B2
(45) Date of Patent: Sep. 20, 2016

(54) PROFINET ETHERNET ADAPTER

(71) Applicant: Phoenix Contact GmbH & Co. KG, Blomberg (DE)

(72) Inventor: Gunnar Lessmann, Niehheim (DE)

(73) Assignee: Phoenix Contact GmbH & Co. KG (DE)

( * ) Notice: Subject to any disclaimer, the term of this patent is extended or adjusted under 35 U.S.C. 154(b) by 86 days.

(21) Appl. No.: 14/374,167

(22) PCT Filed: Feb. 8, 2013

(86) PCT No.: PCT/EP2013/000377
§ 371 (c)(1),
(2) Date: Jul. 23, 2014

(87) PCT Pub. No.: WO2013/124037
PCT Pub. Date: Aug. 29, 2013

(65) Prior Publication Data
US 2014/0341220 A1    Nov. 20, 2014

(30) Foreign Application Priority Data

Feb. 22, 2012    (DE) .................... 10 2012 003 370

(51) Int. Cl.
*H04L 12/28* (2006.01)
*H04L 29/06* (2006.01)
(Continued)

(52) U.S. Cl.
CPC .......... *H04L 69/18* (2013.01); *H04L 12/40032* (2013.01); *H04L 12/4625* (2013.01); *H04L 45/741* (2013.01); *H04L 49/35* (2013.01); *H04L 49/40* (2013.01)

(58) Field of Classification Search
CPC ....................................... H04L 69/18

USPC ........................................... 370/392
See application file for complete search history.

(56) References Cited

U.S. PATENT DOCUMENTS

2006/0109866 A1 *   5/2006   Janssen ............. H04L 12/40156
                                                          370/493
2009/0060509 A1 *   3/2009   Shimoosako ......... H04J 3/1694
                                                             398/66

FOREIGN PATENT DOCUMENTS

DE       102006058330 A1    6/2008
EP           1906601 A1     4/2008
(Continued)

OTHER PUBLICATIONS

Officer: Anges Wittmann-Regis, "Related International Patent Application No. PCT/EP2013/000377", "International Preliminary Report on Patentability", Sep. 4, 2014, Publisher: PCT/IB, Published in: CH.

(Continued)

*Primary Examiner* — Shripal Khajuria
(74) *Attorney, Agent, or Firm* — Kaplan Breyer Schwarz & Ottesen, LLP (57) ABSTRACT

A PROFINET adapter having at least one first and one second Ethernet interface for coupling a subscriber to a PROFINET network. The PROFINET adapter comprises a third Ethernet interface, a number of at least one application interface and a splitter. The third Ethernet interface is designed at least for exchanging Ethernet-based data packets. The splitter is connected to the switch, the PROFINET protocol stack, the application interfaces and the third Ethernet interface, and is designed to divide real-time data packets and near real-time data packets according to a certain configuration and to transmit them between the switch and the application interface and/or the third Ethernet interface.

14 Claims, 7 Drawing Sheets

(51) Int. Cl.
*H04L 12/40* (2006.01)
*H04L 12/46* (2006.01)
*H04L 12/931* (2013.01)
*H04L 12/56* (2006.01)

(56) References Cited

FOREIGN PATENT DOCUMENTS

| EP | 2410697 A1 | 1/2012 |
|---|---|---|
| WO | 2006136201 A1 | 12/2006 |
| WO | 2010107346 A1 | 9/2010 |

OTHER PUBLICATIONS

"Parent Application in Germany: DE 10 2012 003 370.2", "German Office Action", Oct. 1, 2012, Publisher: DPM, Published in: DE.

"Related Internation Patent Application No. PCT/EP2013/000377", "International Search Report and Written Opinion", Apr. 29, 2013, Publisher: PCT, Published in: NL.

"PROFINET Systembeschreibung Technologie und Anwendung", "PROVIBUS—PROFINET", Jun. 2011, pp. 1-28, vol. 4.131, Publisher: PROFIBUS Nutzerorganisation e.V., Published in: DE.

* cited by examiner

PROFINET ETHERNET ADAPTER

FIELD OF THE INVENTION

The present invention relates to a PROFINET adapter having at least one first and one second Ethernet interface for coupling a subscriber to a PROFINET network.

BACKGROUND OF THE INVENTION

PROFINET is one of the leading industrial standards for real-time Ethernet systems (RTE). The PROFINET standard basically differentiates between two possible forms of real-time communication, namely the real-time variant (PROFINET RT) and the isochronous real-time variant (PROFINET IRT). Common to both variants is that, in addition to transmitting real-time data (RT or IRT) with a high bandwidth, near real-time data (NRT data), for example TCP/IP-based data packets, can also be transmitted via the PROFINET network. A PROFINET network is usually based on a 100 MBit/s full duplex transmission via Ethernet switches.

In the PROFINET RT variant, the real-time data packets are transmitted cyclically on the ISO/OSI layer 2 of the Ethernet standard (MAC layer). The real-time data packets are processed and transmitted in the switches with a higher priority compared with the near real-time data packets. This ensures that the RT communication from the transmitter to the receiver is processed preferentially compared with the NRT communication. As, in the PROFINET RT variant, the data transmission does not take place in a chronologically correlated manner, jitter, which depends mainly on the number of switches on the data transmission path at which packets are injected, occurs on the path from the transmitter to the receiver. The appropriate PROFINET RT devices or subscribers can be implemented with standard Ethernet interfaces. The same applies to the switches, which, apart from the prioritization, do not have to fulfill any special requirements.

The isochronous real-time (IRT) variant is an extension of PROFINET RT. With PROFINET IRT, the transmission of real-time data is planned chronologically, wherein the transmission of the IRT data takes place in a reserved time range. Outside this reserved time range, the transmission of NRT data is possible as with PROFINET RT. With PROFINET IRT, the jitter of the real-time data on the path from the transmitter to the receiver is less than with PROFINET RT and, further, independent of the number of switches on the data transmission path at which packets are injected.

PROFINET IRT requires special Ethernet hardware in the switches and the devices or subscribers. Existing Ethernet interfaces can therefore only be used to a limited extent.

In both variants, RT and IRT, the PROFINET subscribers are identified by a symbolic name, also referred to as PROFINET device name. This name can be assigned during commissioning, e.g. by a software tool. In addition to this name, an IP address is also necessary, as parts of the PROFINET protocol rely on the IP layer of the Ethernet standard. The IP address is used for addressing the NRT data packets; the RT and IRT data packets are usually addressed via the MAC addresses.

The subscribers in a PROFINET network are preferably networked with one another in a linear structure. As a rule, the switches for RT or IRT communication are integrated within the respective subscribers. For this purpose, each of the subscribers has a PROFINET adapter having at least one first and one second Ethernet interface and an integrated RT/IRT switch with appropriate memory and CPU resources. Each subscriber is connected to its predecessor and its successor in the linear network by means of these two Ethernet interfaces. As well as its fixed MAC address, an IP address and a symbolic PROFINET name are assigned to each PROFINET adapter. The assignment of the IP addresses to the symbolic names on the one hand and to the MAC addresses on the other can be undertaken by a DHCP server (Dynamic Host Configuration Protocol) or by means of the DCP (Discovery and Basic Configuration Protocol) of the PROFINET standard.

Various interfaces for connecting a particular subscriber can be addressed using a PROFINET protocol stack in the adapter. For example, a PROFINET adapter can provide an I/O interface, a serial UART (Universal Asynchronous Receiver Transmitter) and/or a parallel interface, e.g. for a microcontroller. As a rule, the I/O interfaces convert real-time I/O data directly into digital input/output signals, wherein the I/O data are exchanged with the PROFINET as RT or IRT data packets. A microcontroller can be designed to exchange both real-time data and near real-time data with the PROFINET.

A PROFINET adapter can, for example, also be part of a plug-in card, by means of which an industrial PC can be coupled to a PROFINET network via the two Ethernet interfaces of the adapter. The plug-in card, i.e. the adapter, is assigned an IP address via its symbolic PROFINET name, wherein, as a rule, an application on the PC also has its own IP address. The exchange of NRT data takes place by means of TCP/IP-based data packets which are addressed to the IP address of the adapter which is assigned to a particular subscriber.

The microcontrollers or the industrial PCs frequently have an integral Ethernet interface which, equipped with a PROFINET protocol stack, enable direct TCP/IP-based communication with the PROFINET network. For this purpose, the integral Ethernet interface of the microcontroller or of an industrial PC would have to be connected to a third Ethernet interface which is provided by the switch of the associated PROFINET adapter in each case.

SUMMARY OF THE INVENTION

It is disadvantageous when making direct use of TCP/IP services that a PROFINET subscriber, which in each case comprises a PROFINET switch or adapter and a microcontroller or an industrial PC, presents itself with two different IP addresses, namely the IP address of the switch or adapter and the IP address of the microcontroller or industrial PC.

The object of the present invention is to enable direct NRT communication via TCP/IP with a subscriber connected to a PROFINET switch or adapter which avoids the problem of two IP addresses for one device or subscriber and simplifies the connection of components with Ethernet interfaces to RT or IRT networks.

The PROFINET adapter comprises a switch having at least one first and one second Ethernet interface for connecting to a real-time-enabled PROFINET network. The switch is therefore at least suitable for receiving and transmitting TCP/IP-based PROFINET data packets and TCP/IP data packets as well as PROFINET RT or PROFINET IRT-based data packets.

Furthermore, the PROFINET adapter comprises a PROFINET protocol stack and a number of at least one application interface.

According to the invention, the PROFINET adapter further has a third Ethernet interface and a splitter. The third Ethernet interface is designed at least for exchanging Ethernet-based data packets.

The splitter is connected to the switch, the PROFINET protocol stack, the application interfaces and the third Ethernet interface, and is designed to divide real-time data packets and near real-time data packets according to a certain configuration and to transmit them between the switch and the application interface and/or the third Ethernet interface.

A first of the at least one application interface can be an I/O interface.

An I/O interface can be designed for processing both safe and non-safe input/output signals. For example, an EMERGENCY STOP signal, which can be transmitted in the PROFINET network to the third Ethernet interface in parallel with the Ethernet-based data packet, can be provided at a safe signal input.

The splitter is preferably configured in such a way as to transmit a real-time data packet or the I/O data of the real-time data packet which is addressed to the PROFINET adapter between the switch and the I/O interface.

The splitter can also be configured to transmit a near real-time data packet addressed to the PROFINET adapter to the third Ethernet interface.

The near real-time data packet can be an Ethernet-based data packet.

For example, a TCP/IP, PROFINET and PROFINET RT/IRT data packet are considered to be Ethernet-based data packets.

Furthermore, the PROFINET adapter can be designed to assign an IP address to an Ethernet-communications-enabled device, wherein this device can be connected to the third Ethernet interface and wherein the IP address is the same as the IP address of the PROFINET adapter, and/or to assign a symbolic name or PROFINET device name, which is the same as its own PROFINET device name, to an Ethernet-communications-enabled device which can be connected to the third Ethernet interface.

The splitter can therefore be designed to transmit a near real-time data packet from the third Ethernet interface to the switch.

The solution according to the invention further includes a method for transmitting real-time data packets and near real-time data packets between a switch and at least one application interface and/or the third Ethernet interface of a PROFINET adapter described above.

According to the invention, the real-time data packets and the near real-time data packets are divided by a splitter.

The real-time data packets can be transmitted to the application interface by means of the splitter. Optionally, the real-time data packets can also be transmitted to the third Ethernet interface.

The near real-time data packets are preferably transmitted to the third Ethernet interface by the switch. The near real-time data packets are preferably designed as Ethernet-based data packets.

The near real-time data packets from the third Ethernet interface are transmitted to the switch.

An IP address of the PROFINET adapter can be used as a source address for the near real-time data packets.

A core element of the invention is therefore a splitter, via which all TCP/IP, PROFINET and PROFINET RT/IRT data packets which come from the PROFINET adapter or are transmitted thereby are routed. The PROFINET adapter is connected to the splitter and is addressed by means of its IP address and/or its MAC address.

PROFINET RT data packets can be freely configurably transmitted by means of the splitter according to the invention from the switch to the application interfaces, e.g. an I/O interface or a microprocessor interface, and/or to the Ethernet interface in that these data sinks are individually switched on or off by the splitter.

Conversely, PROFINET RT data packets can also be transmitted from the I/O interface, the microprocessor interface and the third Ethernet interface to the switch, wherein the splitter can be configured such that all data sources can be individually switched on or off. The priority of these individual sources can also be configured. Real-time data packets are provided with the MAC address of the PROFINET adapter.

TCP/IP data packets are preferably transmitted directly to the third Ethernet interface by means of the splitter. Alternatively, the data from the Ethernet-based data packet can also be fed to the microprocessor interface.

BRIEF DESCRIPTION OF THE DRAWINGS

The invention is described in detail below based on exemplary embodiments with reference to the attached drawings. In the drawings.

DETAILED DESCRIPTION

Figure 1:
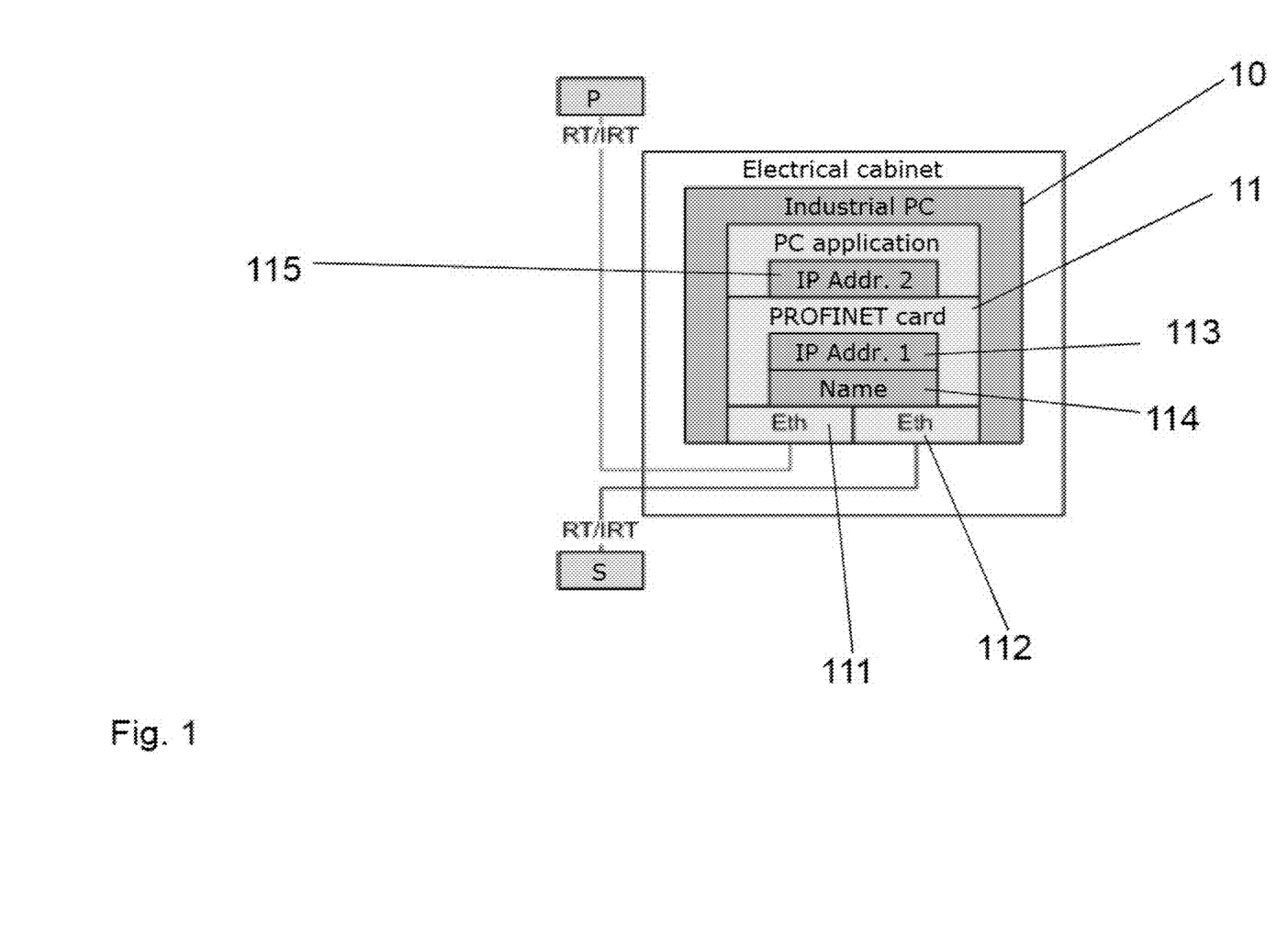
FIG. 1: shows a connection of an industrial PC to a PROFINET network according to the prior art.

Using an industrial PC as an example, a possibility for connecting devices to a PROFINET network is shown in FIG. 1, wherein however the connection principle also applies to other types of device.

In automation engineering, the installation usually follows that of the system, so that a PROFINET network preferably has a linear topology. The linear structure or linear cabling of the network is guaranteed in that the RT or IRT switches necessary for PROFINET are integrated into the subscribers.

The industrial PC 10 shown, together with the PROFINET card 11, which is plugged into a slot, forms a PROFINET subscriber. The PROFINET card 11 comprises a PROFINET RT/IRT switch, from which a first Ethernet interface 111 and a second Ethernet interface 112 are served. Furthermore, the PROFINET card 11 comprises a PCI interface, for example, and therefore forms a PROFINET adapter, by means of which an automation application running on the industrial PC can exchange near real-time data (NRT data), for example, with the PROFINET network by means of TCP/IP data packets.

The PROFINET card 11 has a fixed MAC address and an assigned symbolic PROFINET name 114. During an initialization phase of the PROFINET network, an IP address 113 can be assigned to the card, for example by a DHCP server.

The first and second Ethernet interface 111 and 112 of the PROFINET card constitute an essential component for providing a required linear structure of the PROFINET network, in which, for example, a connection to a preceding network subscriber is made by means of the first Ethernet interface 111 and a connection to a subsequent subscriber by means of the second Ethernet interface 112.

As can be seen from FIG. 1, the application on the industrial PC has its own IP address 115.

Figure 2:
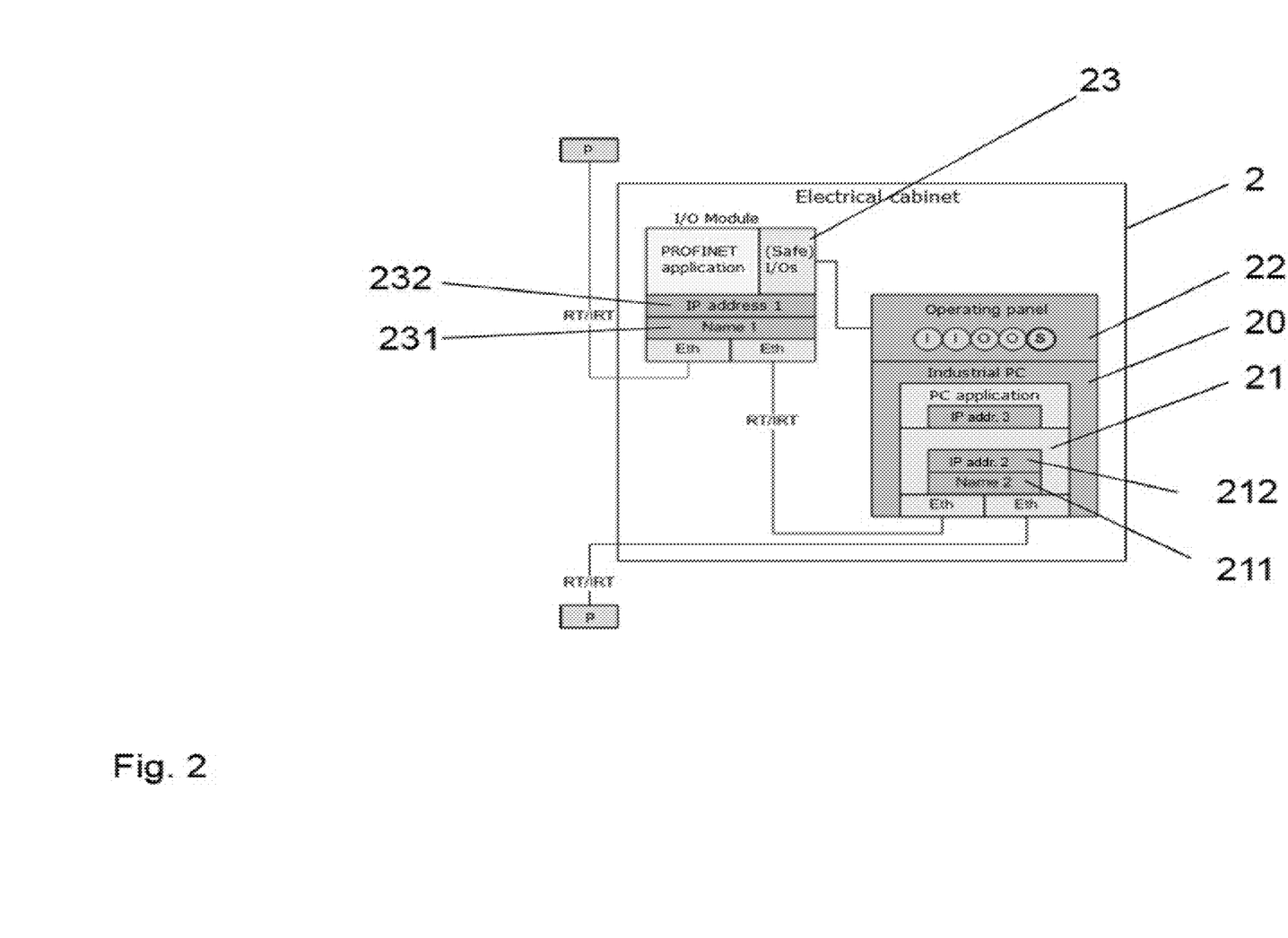
FIG. 2: shows a first common connection of an industrial PC and a PROFINET I/O device to a PROFINET network according to the prior art.

FIG. 2 shows an industrial PC 20 with a PROFINET card 21 which, together with a PROFINET I/O device, which comprises an operating panel 22 and an associated PROFINET adapter 23, is connected to a PROFINET network. A symbolic PROFINET name 211 and 213 and an IP address 212 and 232 are in each case assigned to the PROFINET card 21 and to the PROFINET adapter 23. For the user, from the outside, the PC and the I/O device, integrated into a common housing, constitute a common device or a common subscriber unit 2, even though, from the network point of view, they are commensurate with two PROFINET subscribers which are connected in tandem.

Figure 3:
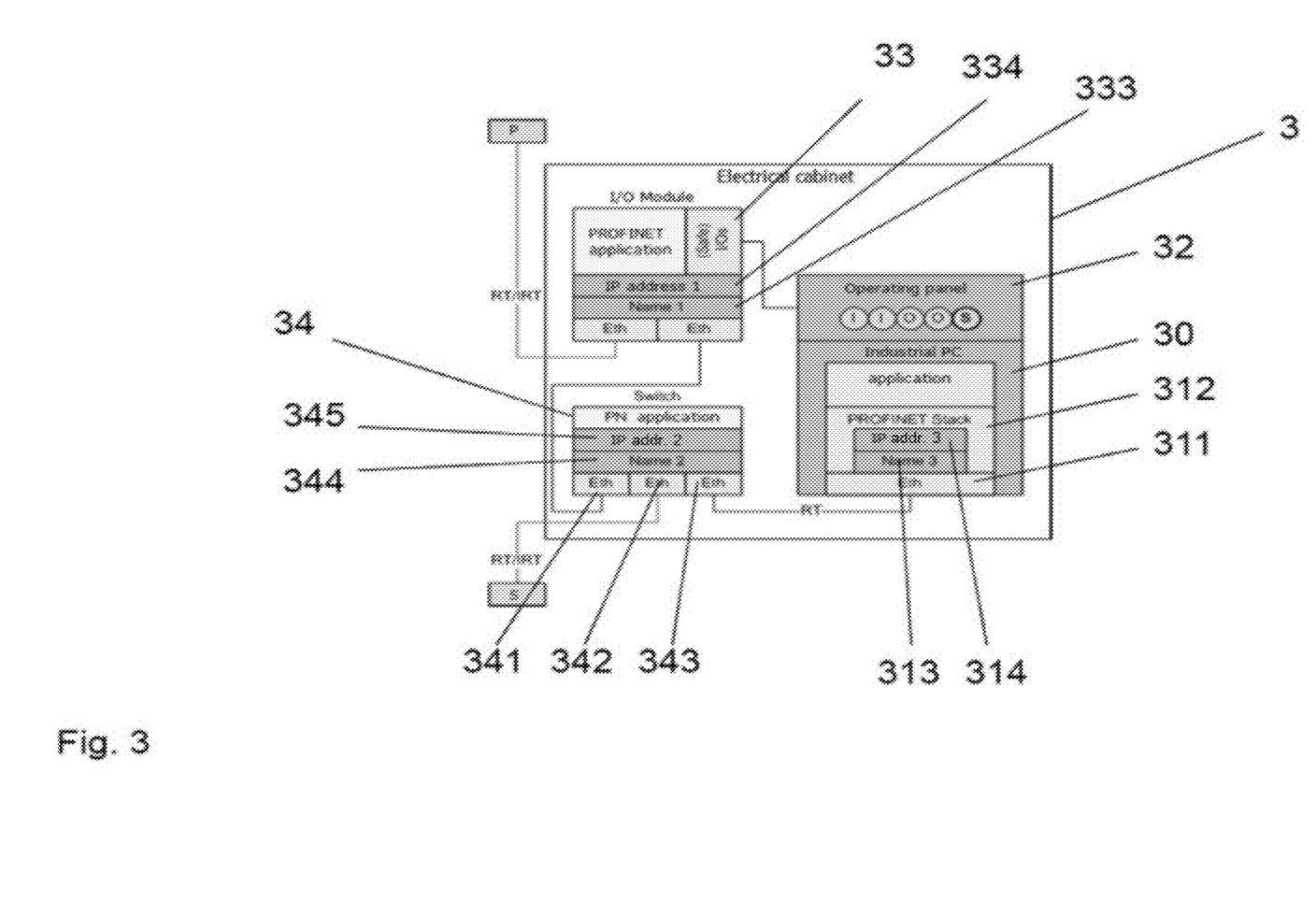
FIG. 3: shows a second common connection of an industrial PC and a PROFINET I/O device to a PROFINET network according to the prior art.

An alternative design of a subscriber unit shown in FIG. 2 is shown in FIG. 3. The industrial PC 30 has an integral Ethernet interface 311. A PROFINET protocol protocol-stack 312 is installed on the operating system of the industrial PC, so that the Ethernet interface 311, which as a rule is used for a TCP/IP-based LAN, works as a PROFINET interface. A symbolic PROFINET name 313, by means of which an IP address 314 is assigned to the industrial PC or to its PROFINET protocol stack, is assigned to the PROFINET protocol stack 312 of the industrial PC.

In turn, the PROFINET I/O device comprises an operating panel 32 and a PROFINET adapter 33, to which a symbolic PROFINET name 333 and an IP address 334 are assigned. Associated with the subscriber unit 3 shown is a PROFINET switch 34, which has three Ethernet interfaces 341, 342 and 343 and a symbolic PROFINET name 344 and an assigned IP address 345.

The industrial PC 30 is connected to the PROFINET network by means of the PROFINET switch 34, wherein, from the network point of view, the switch 34 and the PROFINET adapter 33 of the operating panel 32 constitute two PROFINET subscribers which are connected in tandem.

It is disadvantageous with a respective connection of an industrial PC in a PROFINET network according to FIGS. 2 and 3 that two symbolic PROFINET names and three IP addresses have to be administered on the network side.

Figure 4:
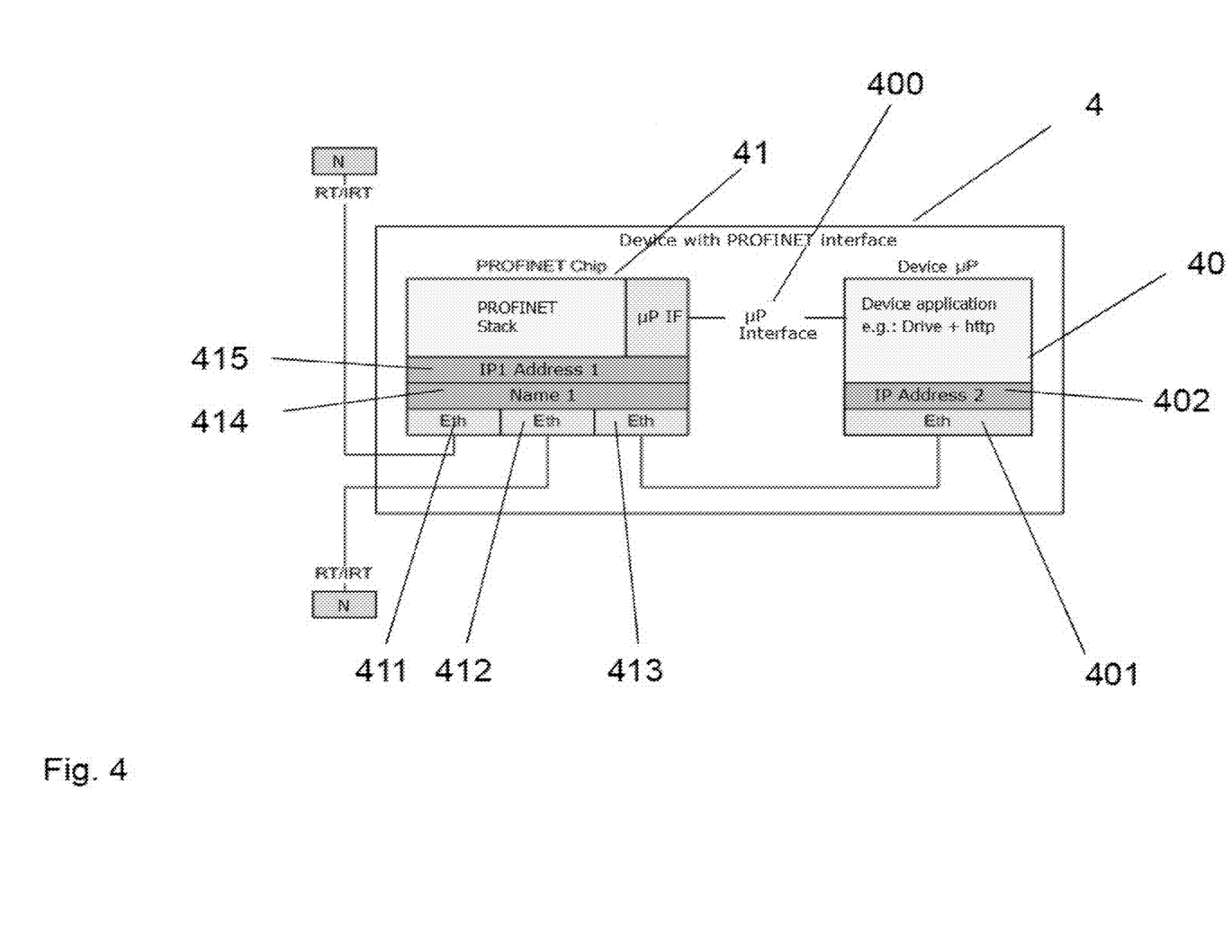
FIG. 4: shows a connection of a PROFINET device to a PROFINET network according to the prior art.

A PROFINET device 4 which has a microcontroller 40 and PROFINET adapter 41, which can be arranged as integral components on a printed circuit board for example, is shown in FIG. 4. The microcontroller 14 provides the actual device application of the PROFINET device for, e.g. an actuation of a drive. The PROFINET adapter 41 and the microcontroller 40 are connected to one another by means of an interface 400. The PROFINET adapter 41 comprises a first and a second Ethernet interface 411 and 412 for connecting to the PROFINET network. Further, the PROFINET adapter 41 contains a PROFINET protocol stack with which the data between the PROFINET network and interface 400 can be implemented. As well as a MAC address, the PROFINET adapter 41 has a symbolic PROFINET name 414, by means of which an IP address 415 can be assigned.

As a rule, the I/O data, for example for controlling a drive, are transmitted as real-time data between PROFINET network and the PROFINET device 4, wherein the RT or IRT data packets are addressed via the MAC address of the PROFINET adapter 41.

As a rule, parameter data for configuring the microcontroller are transmitted as NRT data packets by means of TCP/IP-based transmission via the PROFINET network. The TCP/IP data packets can, for example, be addressed to the IP address of the PROFINET adapter 41, so that the parameter data contained therein can be transmitted to the microcontroller 40 via the interface 400.

Many microcontrollers already have an integral Ethernet interface 401, thus enabling the microcontrollers to exchange data directly with the PROFINET network by means of TCP/IP-based communication. For this purpose, the PROFINET chip 41 of the PROFINET device 4 shown in FIG. 4 has a third Ethernet interface 430, by means of which a direct Ethernet connection is provided to the microcontroller 40. The microcontroller 40 has an IP address 402 for the TCP/IP-based data communication.

As with the connection of an industrial PC in a PROFINET network, there is the problem with the PROFINET device 4 that, for direct TCP/IP-based communication with the microcontroller 40, an additional IP address has to be administered in the PROFINET network and assigned by means of suitable mechanisms.

Figure 5:
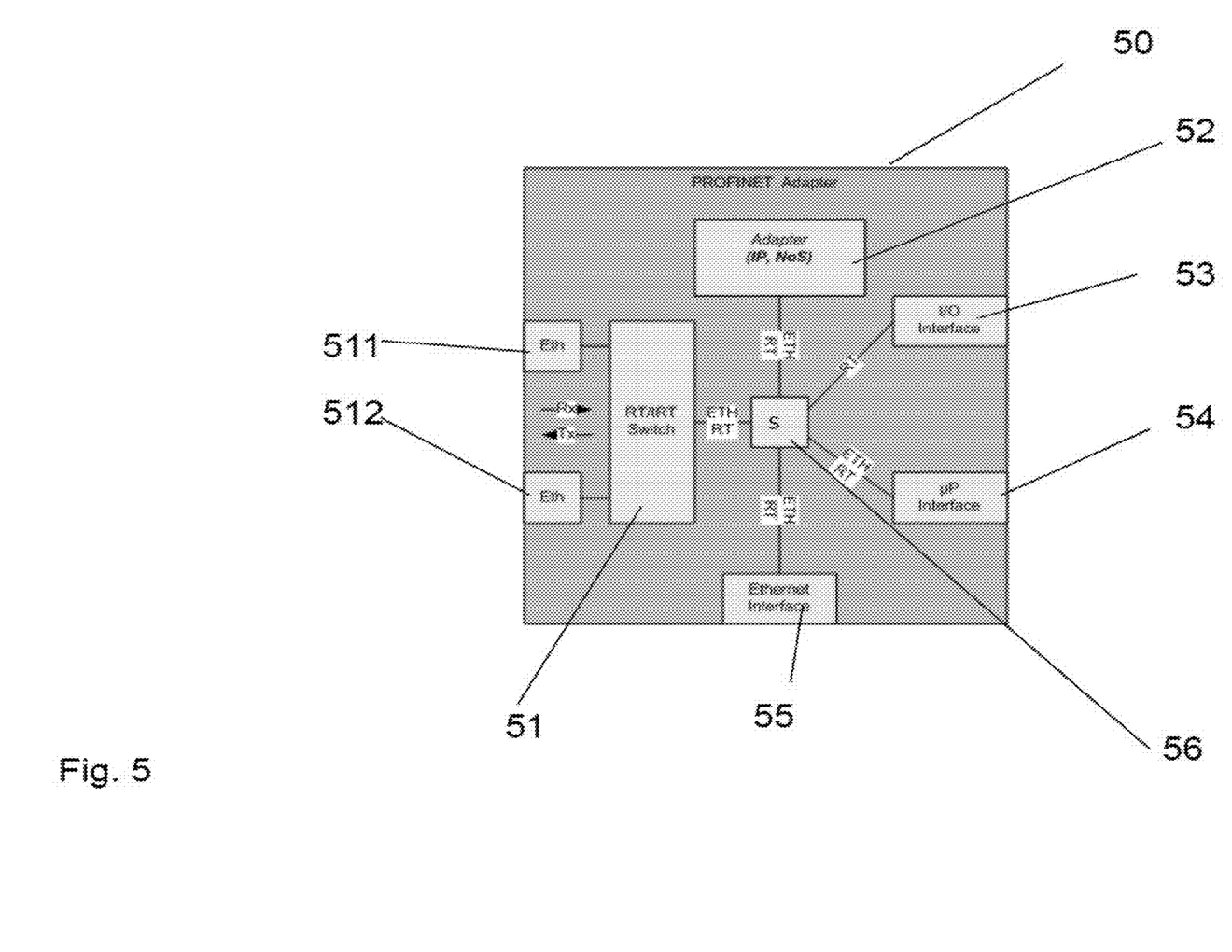
FIG. 5: shows a PROFINET adapter according to the invention.

A PROFINET adapter 50 according to the invention which has a PROFINET RT/RT-enabled switch 51 with a first and second Ethernet interface 511 and 522, by means of which in each case a network connection to a preceding and to a subsequent subscriber in a PROFINET network can be made, is shown in FIG. 5.

A PROFINET protocol protocol-stack 52 is implemented in the PROFINET adapter 50 according to the invention. Furthermore, the PROFINET adapter 50 according to the invention has, for example, an I/O interface 53, a microprocessor interface 54, and a third Ethernet interface 55.

The core element of the PROFINET adapter 50 according to the invention is a splitter 56, via which all data packets which are received or transmitted by the PROFINET adapter 50 are routed. These data packets can contain RT or IRT data as well as NRT data. The PROFINET adapter 50 can be addressed by means of its symbolic PROFINET name, by means of its IP address or by means of its MAC address. The PROFINET protocol stack 52 is directly connected to the splitter 56.

The splitter 56 is designed to divide the RT, IRT and NRT data packets and/or the appropriate data between the switch 51 and the appropriate interfaces 53, 54 and 55 and the PROFINET protocol stack 52.

The PROFINET RT data packets are transmitted from the switch 51 to the I/O interface 53, to the microprocessor interface 54, to the third Ethernet interface 55 and/or are processed by the PROFINET protocol stack 52. At the same time, the splitter 56 can be configured such that all interfaces can be switched on or off individually.

Conversely, the PROFINET RT data packets can be transmitted from the PROFINET protocol stack 52, from the I/O interface 53, from the microprocessor interface 54 or from the third Ethernet interface 55 to the switch 51. By configuration of the splitter 56, the interfaces can be individually switched on or off or differently prioritized.

Likewise, the NRT data packets can be transmitted from the switch 51 to the microprocessor interface 54, to the third Ethernet interface 55 and/or processed by the PROFINET protocol stack 52. Conversely, the NRT data packets can be transmitted from the microprocessor interface 54, the Ethernet interface 55 and from the PROFINET protocol stack 52 to the switch 51. With regard to the distribution of NRT data packets, the splitter 56 can also be configured such that all sources can be individually switched on or off. The priority of the individual sources can also be defined.

The RT and/or NRT data packets originating from the third Ethernet interface 55 are in each case provided with the MAC address of the PROFINET adapter 50 in the splitter 53. A device connected to the third Ethernet interface 55 of the PROFINET adapter 50 can determine the IP address of the adapter (e.g. via DHCP) and set up its own IP address on this address. Correspondingly, in addition or alternatively, a PROFINET device name which corresponds to the PROFINET device name of the PROFINET adapter 50 can be assigned to an Ethernet-communications-enabled device which can be connected to the third Ethernet interface 55 of the PROFINET adapter 50.

The data transmitted between the switch 51 and the Ethernet interface 55 can be processed by the splitter in a freely configurable matter. For example, the fragmentation and defragmentation of the Ethernet data is conceivable by this means.

Figure 6:
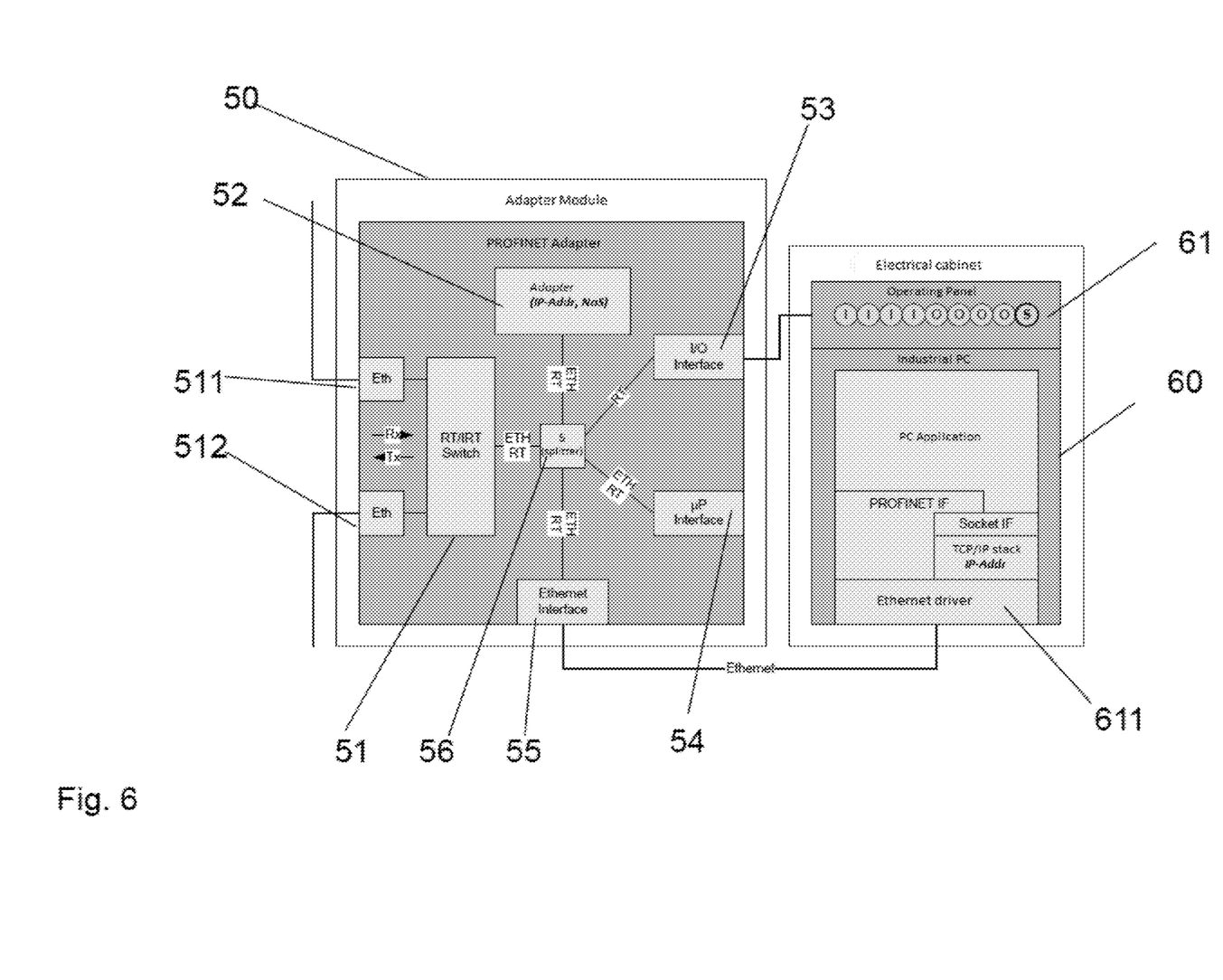
FIG. 6: shows a common connection of an industrial PC and a PROFINET I/O device to a PROFINET network with a PROFINET adapter according to the invention.

An industrial PC 60 and an operating panel 61, which are connected to a PROFINET network by means of a PROFINET adapter 50 according to the invention, are shown in FIG. 6. The operating panel 61 is connected to the I/O interface 53 of the PROFINET adapter 50. The inputs and outputs of the I/O interface 53 which are connected to the control devices of the operating panel 61 can be safe and/or non-safe inputs and outputs. The industrial PC 60 has an Ethernet interface 611 which is connected to the third Ethernet interface 55 of the PROFINET adapter 50.

The RT data packets for activating the I/O interface 53 are routed to the PROFINET protocol stack 52 by the splitter 56. The real-time data are routed further to the I/O interface 53.

The industrial PC 60 can be accessed directly via the IP address of the PROFINET adapter, wherein the TCP/IP-based NRT data packets are routed from the splitter 56 via the third Ethernet interface 55 to the Ethernet interface 611 of the industrial PC. The TCP/IP-based NRT data packets to be transmitted by the industrial PC 61 are already provided with the IP address of the PROFINET adapter in the TCP/IP stack of the industrial PC and are transmitted to the PROFINET network via the splitter 56 and the switch 51. It is not necessary to set up the IP address at the industrial PC separately, as the industrial PC has been automatically set to the IP address of the PROFINET adapter 50. The automatic setting of the IP address is carried out, for example, by means of DHCP between the PROFINET adapter 50 and the industrial PC 60. In a corresponding manner, the industrial PC can have also have been automatically set up to the symbolic name or PROFINET device name of the PROFINET adapter 50.

An advantage when connecting an industrial PC to a PROFINET network by means of a PROFINET adapter 50 according to the invention is that the function of the PROFINET line is not adversely affected when a PC is replaced. Furthermore, this connection offers a saving of a dedicated I/O module with associated costs and addressing effort.

The jitter in the line is reduced by fragmenting the RT/IRT and NRT data packets in the splitter. In addition, as a result, shorter cycle times in the PROFINET network are conceivable, as the transmission of a 1.5 kByte Ethernet data packet at 100 MBits takes approximately 125 μs. Shorter cycle times are therefore not possible without fragmentation.

Figure 7:
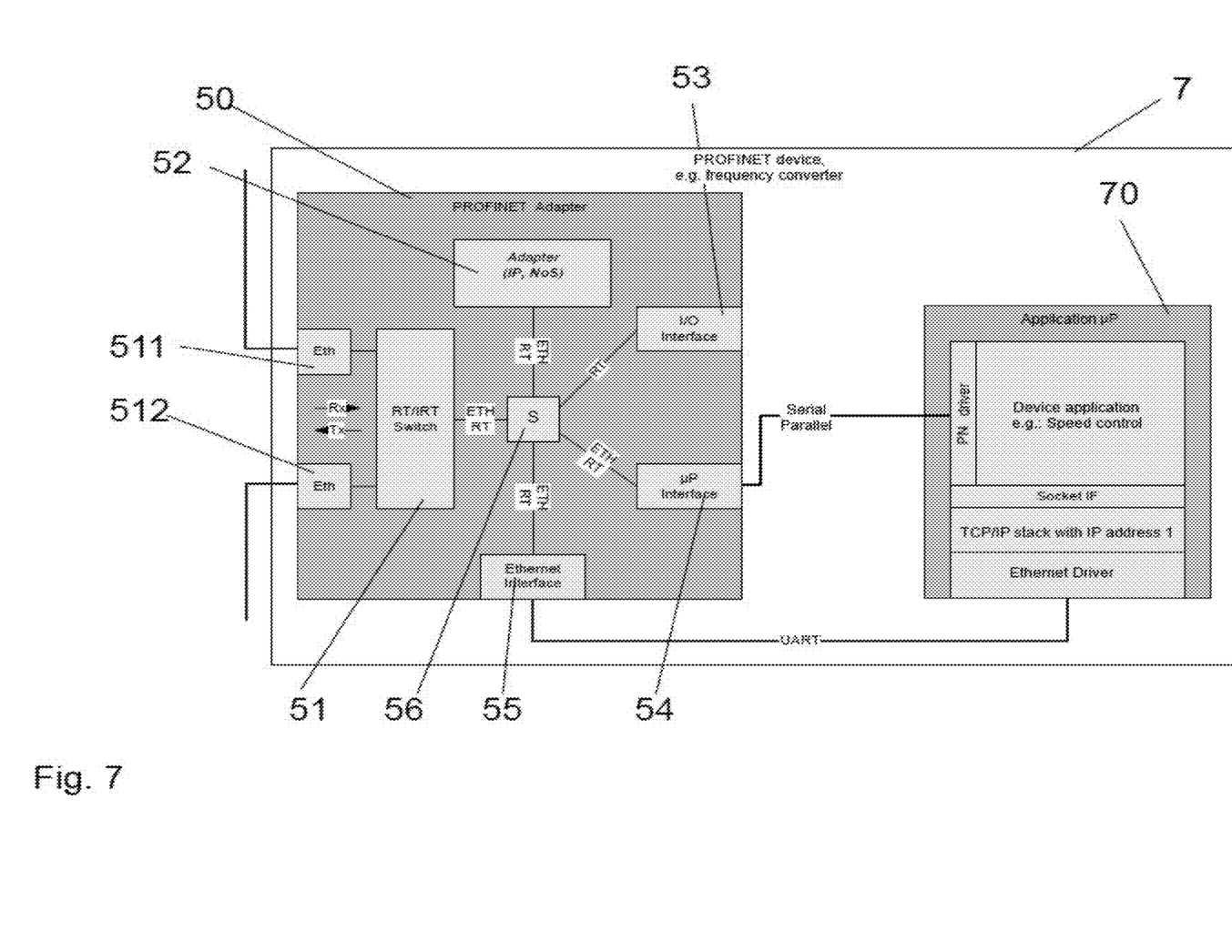
FIG. 7: shows a PROFINET subscriber with a PROFINET adapter according to the present invention.

A PROFINET device 7 which has a microprocessor 70, e.g. a microcontroller, and a PROFINET adapter 50 according to the invention is shown in FIG. 7. The microprocessor 70 is connected to the PROFINET adapter 50 via the microprocessor interface 54, by means of which the PROFINET real-time and near real-time data can be exchanged.

If, in addition, a TCP/IP application is to be executed on the microprocessor 70 (e.g. the web visualization of the speed of a drive), then this can easily be achieved using an existing TCP/IP-based Ethernet interface.

The PROFINET adapter according to the invention is a very easy and cost-effective coupling option and is distinguished particularly in that it is not necessary to match the TCP/IP stack to the PROFINET in the microprocessor 70. In addition, a TCP/IP application of the microprocessor 70 is accessible under the IP address of the PROFINET adapter.

What is claimed is:

1. A PROFINET adapter comprising:
a switch having at least one first and one second Ethernet interface for connecting to a real-time-enabled PROFINET network, a PROFINET protocol stack and a number of at least one application interface, further comprising a third Ethernet interface and a splitter,
wherein the third Ethernet interface is designed at least to exchange Ethernet-based data packets,
wherein the splitter is connected to the switch, the PROFINET protocol stack, the application interfaces and the third Ethernet interface, and is designed to divide real-time data packets and near real-time data packets according to a predetermined configuration and to transmit them between the switch and the application interfaces and/or the third Ethernet interface, and
wherein the PROFINET adapter is designed to assign an IP address which is the same as its own IP address to an Ethernet-communications-enabled device which can be connected to the third Ethernet interface.

2. The PROFINET adapter as claimed in claim 1, wherein a first of the at least one application interfaces is an I/O interface.

3. The PROFINET adapter as claimed in claim 2, wherein the splitter is configured to transmit the I/O data of a real-time data packet, which is addressed to the PROFINET adapter, between the switch and the I/O interface.

4. The PROFINET adapter as claimed in claim 1, wherein the splitter is configured to transmit a near real-time data packet, which is addressed to the PROFINET adapter, to the third Ethernet interface.

5. The PROFINET adapter as claimed in claim 4, wherein the near real-time data packet is an Ethernet-based data packet.

6. The PROFINET adapter as claimed in claim 1, wherein the PROFINET adapter is designed to assign a PROFINET device name which is the same as its own PROFINET device name to an Ethernet-communications-enabled device which can be connected to the third Ethernet interface.

7. The PROFINET adapter as claimed in claim 1, wherein the splitter is designed to transmit a near real-time data packet from the third Ethernet interface to the switch.

8. A method for transmitting real-time data packets and near real-time data packets between a switch and at least one application interface and/or the third Ethernet interface of a PROFINET adapter as claimed in claim 1, wherein the real-time data packets and the near real-time data packets are divided by means of a splitter.

9. The method as claimed in claim 8, wherein the real-time data packets are transmitted to the application interfaces.

10. The method as claimed in claim 8, wherein the real-time data packets are transmitted from the switch to the third Ethernet interface.

11. The method as claimed in claim 8, wherein the near real-time data packets are transmitted from the switch to the third Ethernet interface.

12. The method as claimed in claim 11, wherein the near real-time packets are Ethernet-based data packets which are transmitted to the third Ethernet interface.

13. The method as claimed in claim 8, wherein the near real-time data packets are transmitted from the third Ethernet interface to the switch.

14. The method as claimed in claim 13, wherein an IP address of the PROFINET adapter is used as the source address for the near real-time data packets.

\* \* \* \* \*